Feb. 2, 1943.  W. R. TUCKER  2,309,998
TURRET CONTROL
Filed April 22, 1940  3 Sheets-Sheet 1
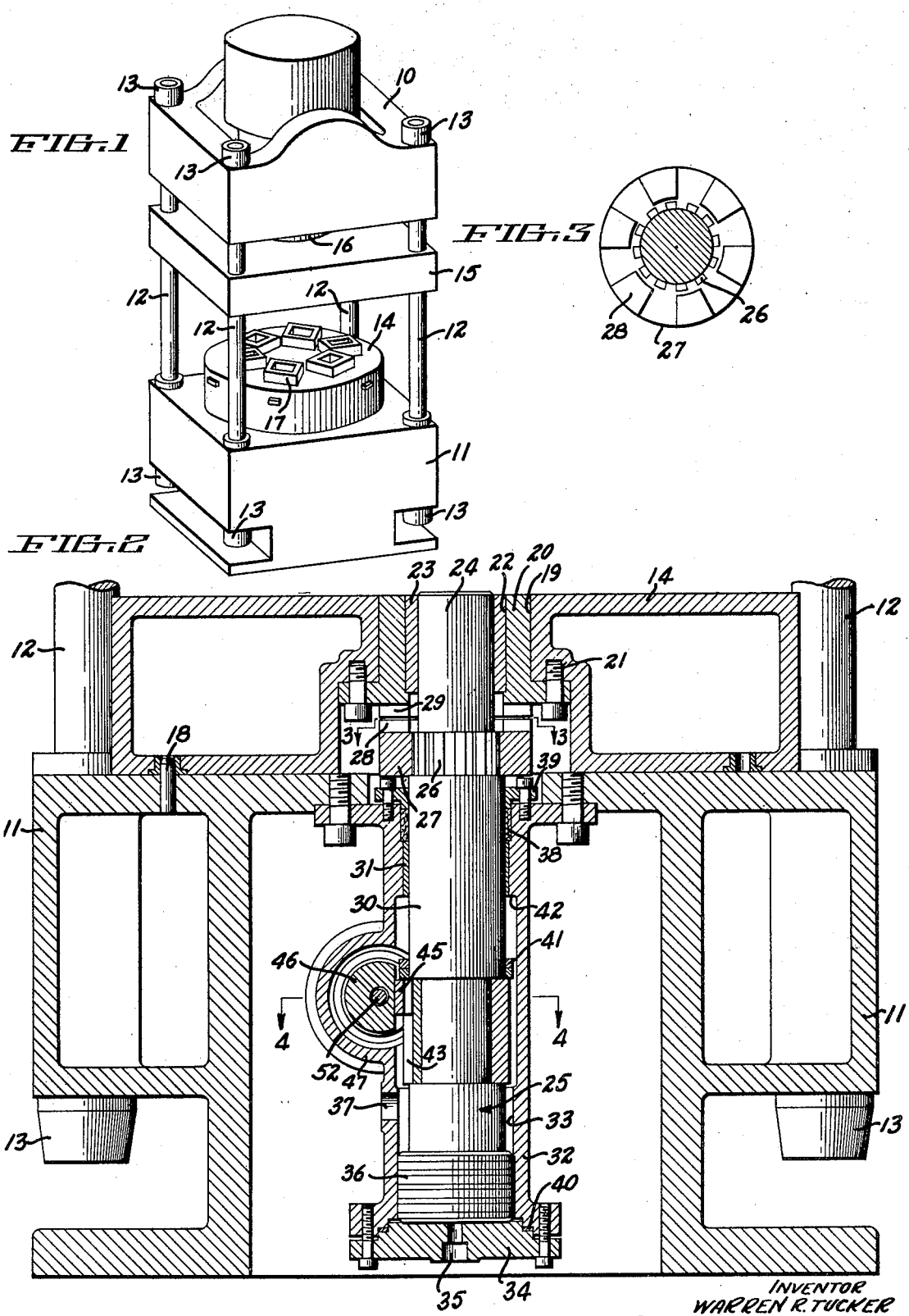
INVENTOR
WARREN R. TUCKER
BY Toulmin & Toulmin
ATTORNEYS

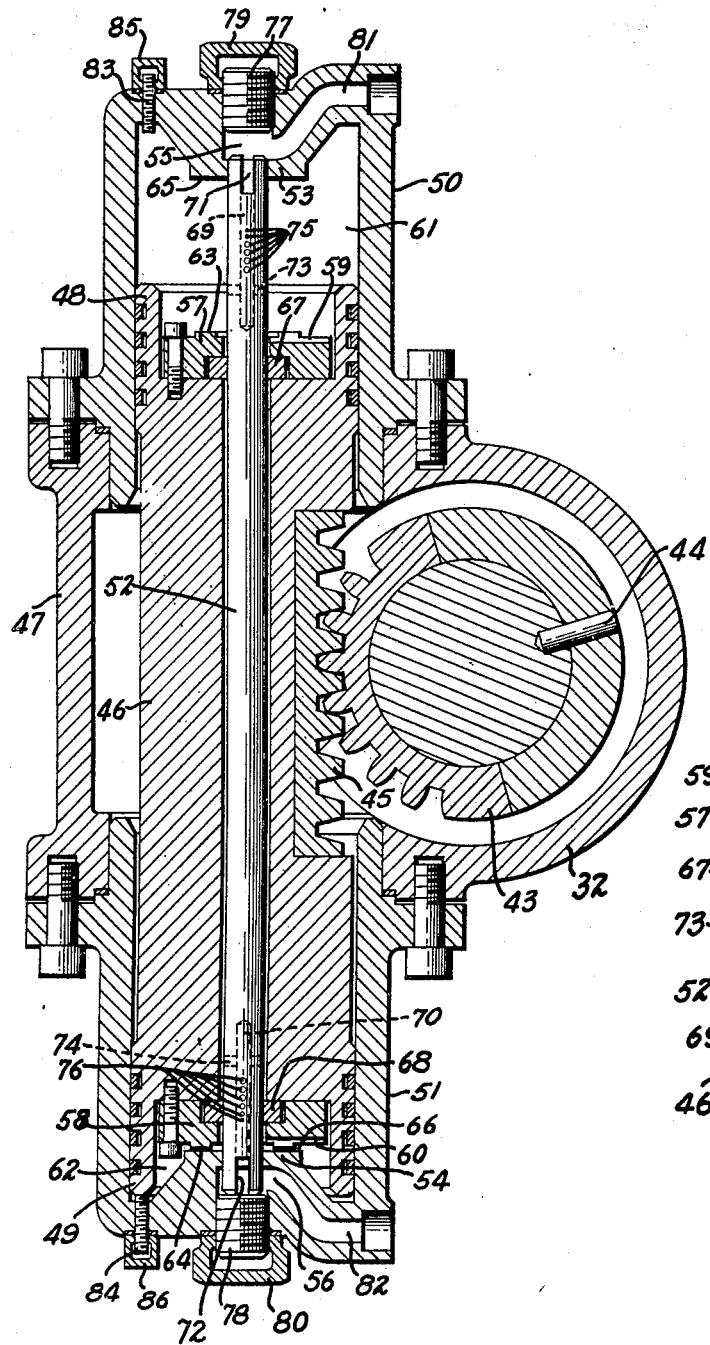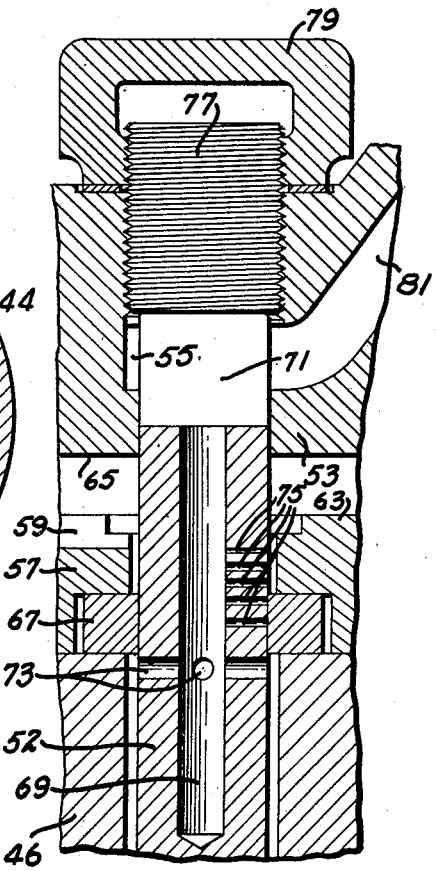

Patented Feb. 2, 1943

2,309,998

UNITED STATES PATENT OFFICE 2,309,998

TURRET CONTROL

Warren R. Tucker, Dayton, Ohio, assignor to The Hydraulic Development Corp. Inc., Wilmington, Del., a corporation of Delaware Application April 22, 1940, Serial No. 330,870

15 Claims. (Cl. 18—20)

This invention relates to presses and press control systems, and in particular to turret presses having rotary turrets for feeding the work-pieces to the press.

One object of this invention is to provide a turret press in which the shifting movement of the turret from one position to another position is hydraulically and gradually slowed down when the turret approaches its new position, so as to avoid any jar or shock.

Another object of the invention consists in providing a turret press in which the turret is shifted from one working position to another working position by mere hydraulic means.

Another object is to provide a turret press in which the turret may be hydraulically lifted off its working position, thereafter hydraulically rotated by a predetermined angle and then hydraulically lowered into another working position.

Another object is to provide a press of the above character in which the shifting movement of the turret is controlled by a hydraulic motor.

A still further object of the invention is to provide a turret press in which the shifting movement of the turret from one working position to another working position is controlled by a hydraulic motor, which once started on its cycle controls valve means for determining the proper sequence of the movements of the turret during a shifting movement from one working position to another working position.

It is a still further object of the invention to provide a turret press in which the shifting movement of the turret from one working position to another working position is effected by a hydraulic motor, the cycle of which is initiated by closing an electric circuit and in which the said hydraulic motor, during its cycle, controls said electric circuit for determining the sequence of the motor movements.

A still further object of the invention is to provide a turret press in which the shifting movement of the turret from one working position to another working position is controlled by a hydraulic motor which may be micromatically adjusted for the exactly desired shifting movement of the turret.

Another object of the invention is to provide a turret press in which the various movements of the turret are timed automatically in a predetermined sequence without the necessity for attention thereto by the operator, or the dependence upon his judgement, such movements including lifting of the turret off the press bed, its rotation, its lowering upon the press bed and the locking of the turret.

These and other objects and advantages of the invention will appear more clearly from the following specification in connection with the accompanying drawings, in which:

Figure 1 is a perspective view of a hydraulic press in which the turret is rotatable between the strain rods of the press.

Figure 2 is a section through the lower portion of the press of Figure 1.

Figure 3 is a section along the line 3—3 of Figure 2.

Figure 4 is a section along the line 4—4 of Figure 2.

Figure 5 shows, on a somewhat larger scale, the upper portion of Figure 4, in which however the centrally arranged valve rod is rotated by 90°.

GENERAL ARRANGEMENT

Figure 6:
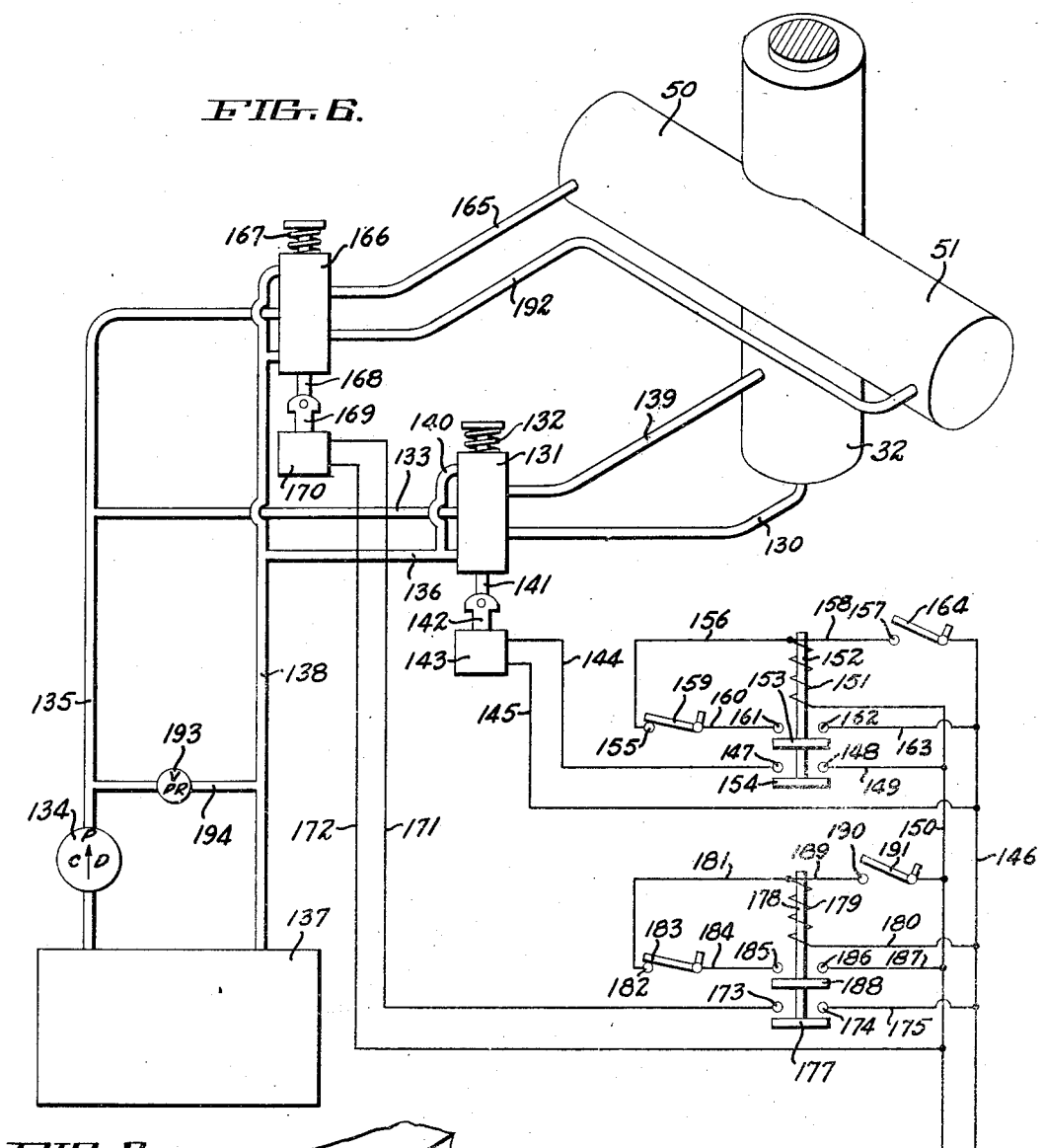
Figure 6 shows a hydraulic and electric control circuit for the turret press according to the present invention.

In general, the turret press of the present invention consists of a press frame having a bed and a head interconnected by strain rods. The turret is normally supported upon the bed of the press during the pressing operation, but is raised from the press bed during its rotating or indexing operation. After the indexing operation is completed, the turret is brought to rest again upon the press bed. The lifting and indexing operation of the turret is effected by means of a hydraulic motor which comprises a plurality of cylinder piston assemblies, one of which effects the lifting and lowering movement of the turret, whereas another cylinder piston assembly causes the rotating movement of the turret.

According to the present invention, the lifting cylinder piston assembly first spaces the turret from the press bed, then is rotated together with the turret by another cylinder piston assembly, whereafter it is lowered to seat the turret again on the press bed, and finally is rotated by means of the other piston cylinder assembly to its initial position so as to be ready for a new cycle.

The movements and sequence of movements of the hydraulic motor for carrying out the indexing movement of the turret, is controlled by valve means which may be arranged in an electric circuit controlled, in its turn, by movements of the hydraulic motor.

MECHANICAL CONSTRUCTION

Referring to the drawings in detail, Figure 1 shows one embodiment of the turret press of this invention, which includes a press head 10, and a press bed 11 interconnected by strain rods 12 with nuts 13 threaded upon the ends thereof, four strain rods 12 being provided between which a turret assembly, generally designated 14, is arranged. Reciprocably mounted upon the strain rods 12 is a platen 15 connected, by any convenient means, to the main pressing plunger or press ram 16. The main plunger 16 may be reciprocated in any conventional manner, and is adapted to carry an upper die cooperating with a lower die to be mounted in the die receiving members 17 arranged on the turret along a circle.

The turret 14 which normally rests upon the press bed 11 and is locked thereon, for instance by means of holding pins 18, has a central bore 19 in which is mounted a bearing 20 connected with the turret 14 by screws 21. The bearing 20 has an inner stepped bore 22 in which is mounted a bushing 23 slidably guiding the shaft portion 24 of the lifting plunger, generally designated 25. The lifting plunger 25 comprises, below the shaft portion 24, a splined portion 26 having rotatably connected therewith a clutch member 27 with jaws 28 adapted to engage correspondingly shaped recesses 29 provided at the lower end of the bearing 20.

The lifting plunger 25 further comprises an enlarged portion 30 slidable in a bushing 31 rigidly connected with a hollow arm 32. The hollow arm 32 comprises a cylinder bore 33 closed at its lower end by a closure member 34 and adapted to be connected with a fluid source by means of a bore 35 in the closure member 34.

Reciprocably mounted in the cylinder bore 33 is a double-acting piston 36 adapted to be moved upwardly by introduction of fluid through the bore 35, while its downward movement is effected by introduction of fluid through the bore 37 in the cylinder wall of the hollow arm 32. Adjacent the upper portion of the hollow arm 32 and below the splined portion 26, packing material 38 compressed by a gland 39 is provided for preventing leakage from the cylinder bore 33. Leakage between the lower bore 32 and the closure member 34 is prevented by a gasket 40 mounted therebetween.

The lifting plunger 25 further comprises, adjacent the lower end of the enlarged portion 30, a stop ring 41 adapted to engage the step 42 at the lower end of the bushing 38 for restricting the upward movement of the plunger 25. Between the enlarged portion 30 and the double-acting piston 36, a segment gear 43 is rotatably connected to the lifting plunger 25, for instance, by means of a pin 44 (see Figure 4). The gear segment 43 engages a rack 45 which is attached to the horizontally arranged ram 46 reciprocably mounted in a casing 47. The ram 46, arranged intermediate the ends of the hollow arm 32 and on one side thereof, is operable to rotate the lifting plunger 25 after it has been elevated. It will be understood that the teeth on the segment 43 and on rack 45 are preferably so elongated as to remain enmeshed even when the lifting plunger 25 is in its lowermost position.

The ram 46 is associated with a cushioning device adapted to cushion the stopping of the ram 46 at the ends of its travel. The ram 46 has piston heads 48 and 49 operating in cylinders 50 and 51 respectively, which are attached to casing 47 in any suitable manner. The ram 46 has an axial bore within which is reciprocably disposed the cushioning valve rod 52 which extends through the ram 46 and beyond the ends of the piston heads 48 and 49.

The ends of the valve rod 52 extends slidably through extremely close fitting guides 53 and 54 formed in the ends of the cylinders 50 and 51 respectively, extending into the cavities 55 and 56 formed in the heads of the cylinders 50 and 51 respectively.

Fixedly carried on the outward ends of the piston heads 48 and 49 are plates 57 and 58 respectively, these plates surrounding the valve rod 52 with constant clearance which is comparable to the clearance existing between the ram 46 and the valve rod 52. These plates 57 and 58 are each formed with a radially extending groove 59 and 60 respectively, which serves to admit the pressure fluid into the pressure cavities 61 and 62 formed in the cylinders 50 and 51 respectively, in a manner which will presently appear. The plates 57 and 58 are formed with an annular abutting portion 63 and 64 respectively, which is adapted to abut the inner faces 65 and 66 of the ends of the cylinders 50 and 51.

The plates 57 and 58 are each further provided with an annular recess within which is received the floating rings 67 and 68. The floating rings 67 and 68 are held in place by the plates 57 and 58 and allowed to move radially to prevent binding of the valve rod 52 due to any misalignment thereof with the rings 67 and 68 and with guides 53 and 54. The floating rings 67 and 68 slidably engage the surface of the valve rod 52 with an extremely close clearance, whereby the escape of pressure fluid along the rings toward the middle of the valve rod 52 is prevented. This construction is exceedingly reliable and compact, and allows the valve rod 52 to shift readily without having the seal destroyed. It will be understood that the rings 67 and 68 likewise engage the surface of the plates 57 and 58 and of the piston heads 48 and 49 slidably, but with extremely close clearance.

The valve rod 52 has axial holes 69 and 70 drilled from both ends of the valve rod as viewed in Figure 4, and the ends of the valve rod 52 are machined with slots 71 and 72 respectively connecting with the holes 69 and 70. On the upper end of the valve rod 52 (with respect to Figure 4) toward the inward end of the hole 69 are four radial connecting holes 73, these connecting holes 73 being relatively large in diameter and being adapted to freely connect the bore 69 with the chamber 61 in the cylinder 50. The other end of the valve rod 52 is similarly provided with identical holes 74. Located outwardly from these holes 73 and 74 are a series of longitudinal spaced connecting holes 75 and 76 respectively, these holes 75 and 76 being progressively more closely spaced and of progressively smaller diameter as one proceeds outwardly from the holes 73 and 74. These holes 75 and 76 are disposed in a single row on only one side of the valve rod 52, instead of extending in four directions as do the holes 73 and 74, and these holes 75 and 76 likewise communicate with the bores 69 and 70.

The ends of the valve rod 52 are adapted to abut against threaded plugs 77 and 78 which are threadably mounted in the ends of the cylinders 50 and 51 respectively. These plugs 77 and 78 are covered by removable end caps 79 and 80 respectively, which serve to prevent unauthorized changes in the positions of the plugs, and also serve to prevent all leakage around the plugs.

Communicating with the cavities or chambers 55 and 56 are conduits 81 and 82 respectively, which are adapted to act either as inlet or discharge conduits, depending upon the direction in which the ram 46 is being moved. The plugs 77 and 78 are so adjusted that when the valve rod 52 abuts against one of them, the slot 71 or 72 in the other end of the rod 52 is adapted to freely interconnect the conduit 81 or 82 and the chamber 55 or 56 with the pressure cavity 61 or 62, this being accomplished by having the slots 71 and 72 made of such a length that the slots extend into the interior of the chamber 61 or 62. This is indicated at the upper portion of Figure 4 in which the slot 71 has a considerable portion disposed within the chamber 61, and hence is adapted to allow free entry of the pressure fluid from the conduit 81 into the chamber 61 where it may act upon the piston head 48 of the ram 46 to move the same away from the fluid inlet.

When the valve rod 52 abuts either of the plugs 77 or 78, its slot 71 or 72 is in non-relationship with the pressure cavity 61 or 62 as is indicated in the lower portion of Figure 4, whereby when the pressure fluid is first admitted, its first action is to move the valve rod 52 axially into engagement with the other plug 77 and 78, this action also serving to bring the slot 71 or 72 in communication with the chamber 61 or 62, thereby allowing the pressure fluid to act upon the piston head 48 or 49.

The device shown in Figures 4 and 5 is furthermore provided with micromatic screws 83 and 84 respectively mounted at each end of the cylinders 50 and 51 and adapted, if desired, to engage the adjacent piston heads 48 and 49 so as to stop the same. These micromatic screws 83 and 84 allow a micromatic adjustment of the stroke of the ram 46. In order to prevent undue operation of the micromatic screws 83 and 84 from the outside of the device, protecting caps 85 and 86, similar to the caps 79 and 80, cover the outer portion of the micromatic screws 83 and 84, while simultaneously acting as locking nuts.

The stroke of the ram 46 is sufficient to produce the desired rotation of the vertical lifting plunger 25. After this desired rotation has been accomplished, the finished surface of the annular abutting portion 63 or 64 of the plates 57 and 58 or ram 46 will be in connection with the finished surface 65 or 66 respectively on the inward surfaces of cylinder 50 or 51.

The reverse rotation, to the same extent, of the lifting plunger 25 will bring the corresponding surfaces 63 or 64 into connection with the surfaces 65 or 66. Thus, Figure 4 corresponds to a position in which the ram 46 is in one of its end positions and ready for a stroke to bring about a rotation of the lifting plunger 25. Upon completion of the rotation of the lifting plunger 25 by movement of the ram 46 toward the conduit 81, the surface 63 of the plate 57 will be in corresponding contact with the surface 65 of the cylinder 50.

Likewise, in Figure 4 the admission of pressure fluid through the conduit 82 will cause the valve rod 52 to move toward the plug 77 and eventually to abut the same, whereupon pressure fluid will freely flow through slot 72 into the chamber 62 where it acts upon the piston head 49 to move the ram 46 toward the surface 65 of the cylinder 50. As ram 46 approaches the limit of its travel toward the surface 65, the cushiong action will take place, this cushioning action being more fully described below in connection with the description of the operation of the device. Similar operation will take place when the ram 46 moves in the reverse direction.

*Hydraulic and electric control circuit*

Referring now to Figure 6 diagrammatically illustrating the hydraulic and electric control circuit in connection with the embodiment of Figures 1 to 5, the bore 26 (see Figure 2) is connected with a conduit 130 leading to a four-way valve 131 comprising a valve member (not shown) which is urged into its upper position by means of a spring 132 and is adapted selectively to establish communication of the conduit 130 with a conduit 133 leading to the pressure side of a pump 134 by means of a conduit 135, or to establish communication between the conduit 130 and the conduit 136 leading to a fluid tank 137 by means of a conduit 138. The bore 37 (Figure 2) of the hollow arm 32 communicates with a conduit 139 likewise leading to the four-way valve 131 and adapted selectively to be connected with a conduit 140 branching off from the conduit 135 or to be connected with the conduit 133.

The shaft 141 of the valve member of the four-way valve 131 is operatively connected with the armature 142 of an electric relay 143, the terminals of which are connected with the lines 144 and 145, the latter leading to the main supply line 146. The line 144 leads to a contact 147 spaced from a contact 148 connected by line 149 with the main supply line 150. The main supply line 150 is connected with a relay coil 151 associated with the armature 152 carrying the switch blades 153 and 154, the latter of which is adapted to bridge the contacts 147 and 148.

The relay coil 151 is connected on one end with a contact 155 by means of the line 156, and on the other end with a contact 157 by means of the line 158. The contact 155 cooperates with the normally closed switch 159 connected by the line 160 with a contact 161 adapted to be connected with a contact 162 by means of the armature blade 163. The contact 162 is connected by the line 163 with the main supply line 146, which latter is connected with a normally open limit switch 164.

Depending on whether the contacts 161 and 162 and the contacts 147 and 148 are bridged by the blades 153 and 154 respectively, and whether the switch 159 is closed or not, relay 143 will either be energized or de-energized so that pressure fluid enters the hollow arm 32 either through conduit 130 or conduit 139 so that the lifting plunger 25 will perform either an upward stroke or a downward stroke.

A control circuit similar to that just described in connection with the hollow arm 32 is provided in connection with the cylinders for the ram 46 in connection with the cylinders 50 and 51. To this end, the conduit 81 (see Figure 4) is connected by means of a conduit 165 with a four-way valve 166 similar to the four-way valve 131 just described. Also in this valve 166, the valve member (not shown) is continuously urged into its upward position by means of a spring 167 and has its shaft 168 operatively connected with an armature 169 of an electric relay 170.

The terminals of the relay 170 are connected by means of the line 171 and 172 with a contact 173 and main supply line 150 respectively. Associated with the contact 173 is a second contact 174 connected by line 175 with the other main supply line 146. Similar to the control circuit described in connection with the hollow arm 32, the contacts 173 and 174 may be bridged by an armature blade 177 of the armature 178, the relay coil 179 of which is connected by means of line 180 with the main supply line 146, and by means of the line 181 with the contact 182 of a normally closed switch 183 having its other contact connected by line 184 with a contact 185. Associated with the contact 185 is a contact 186 connected through line 187 with a main supply line 150 and adapted to be connected with the contact 185 by the plate 188 likewise carried by the armature 178.

The relay coil 179 is furthermore connected by line 189 with the contact 190 cooperating with a normally opened switch 191, the other contact being connected with the main supply line 150.

As will be clear from the above, the energization and de-energization of the relay 170 will cause the pressure fluid from the pump 134 to pass through the conduit 192 connected with the conduit 82, thereby moving the piston head 48 away from the conduit 82, or will direct the pressure fluid passing through the conduit 165 into the conduit 81, thereby moving the piston head 49 toward the conduit 82.

The hydraulic circuit shown in Figure 6 furthermore comprises a pressure relief valve 193 mounted in a conduit 194 connecting the conduits 138 and 135.

Figure 7:
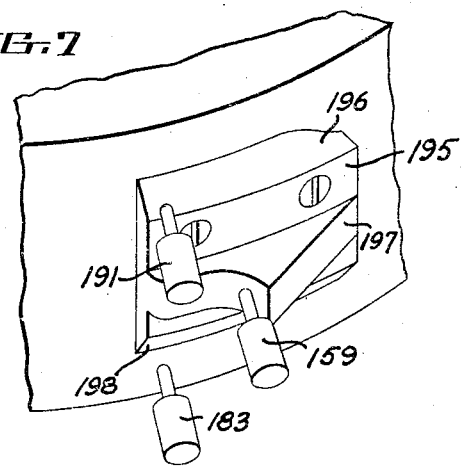
Figure 7 illustrates a detail of the controlling mechanism cooperating with the electric circuit shown in Figure 6.

Figure 7 shows a portion of the turret having arranged on its periphery a plurality of cam blocks generally designated 195, and comprising three cams 196, 197 and 198. The number of the cam blocks corresponds to the number of the turret stations or die receiving member 17. The cams 196, 197 and 198 are so arranged that the cam 196 cooperates with the switch 191, while the cams 197 and 198 cooperate with the switches 159 and 183 respectively.

*Operation*

In operation, when the pressing plunger approaches the end of its retraction stroke, the limit switch 164 is momentarily closed either manually or automatically, for instance, by means of the pressing platen, so that the circuit through the relay coil 151 is closed. Current then flows from the main supply line 146 through switch 164, line 158, relay coil 151, to the main supply line 150. The energization of the relay coil 151 causes attraction of the armature 152 so that the blade 153 of armature 152 bridges the contacts 161 and 162, while the armature blade 154 bridges the contacts 147 and 148. Since the switch 159 is normally closed, the release of the limit switch 164 will not cause de-energization of the relay coil 151 since the attraction of the armature blade 153 closes the holding circuit for the relay coil 151, which holding circuit comprises the main supply line 146, the line 163, contact 162, blade 153, contact 161, line 160, switch 159, contact 155, line 156, relay coil 151 and main supply line 150. The attraction of the armature blade 154 closes the energizing circuit for the relay 143, said circuit comprising the main supply line 146, line 145, relay 143, line 144, contact 147, blade 154, line 149 and main supply line 150.

The energization of the relay 143 causes a downward movement of the armature 142 against the thrust of the spring 132, thereby also moving downwardly the shaft 141 pertaining to the valve member of the four-way valve 131. Downward movement of the valve member pertaining to the four-way valve 131 establishes communication between the conduit 130 and the conduit 133 connected with the pressure side of the pump 134 by means of the conduit 135, while the conduit 139 then communicates with the conduit 140 connected with the fluid tank 137 by conduits 136 and 138. Consequently, pressure fluid from the pump 134 passes through the conduit 130 and enters the bore 35 in the hollow arm 32 thereby lifting the lifting plunger 25 which first causes the clutch member 27 to engage with its jaws 28 correspondingly shaped recesses between the jaws 29 of the bearing 20 connected with the turret 14, and thereafter lifts the turret 14 to such an extent that it disengages the holding pin 18. During this lifting movement of the lifting member 25 the fluid expelled by the piston 36 passes through the bore 37, the conduit 139, the four-way valve 131, conduits 140 and 138 to the tank 137. The lifting movement of the lifting plunger 25 is stopped by the engagement of the stop ring 41 with the step 42.

As soon as the turret 14 has been lifted so as to disengage the holding pin 18, the cam 196 of the cam block 195 causes the switch 191 to engage the contact 190 thereby closing an electric circuit comprising the main supply line 146, line 180, relay coil 179, line 189, contact 190, switch 191 and the main supply line 150. The closure of this circuit causes energization of the relay coil 179 so that the blades 188, 177 respectively, bridge the contacts 185, 186 and the contacts 173, 174. The bridging of the contacts 185, 186 establishes a holding circuit for the relay coil 179, through the main supply line 146, line 180, relay coil 179, line 181, contact 182, the normally closed switch 183, line 184, contact 185, blade 188, contact 186, line 187 and main supply line 150. The bridging of the contacts 173, 174, through the blade 177, closes a circuit comprising the main supply line 146, line 175, contact 174, blade 177, contact 173, line 171, relay 170, line 172 and main supply line 150. The closure of this circuit energizes the relay 170 so that its armature 169, together with the shaft 168 of the valve member pertaining to the four-way valve 166, is moved downwardly against the thrust of the spring 167. This downward movement of the four-way valve 166 establishes communication between the conduit 165 connected with the conduit 81 of the cylinder 50 (see Fig. 4), and the conduit 138 leading to the fluid tank 137. The downward movement of the valve member pertaining to the four-way valve 166 also establishes communication between the conduit 192 leading to the conduit 82 of the cylinder 51 and the conduit 135 leading to the pressure side of the pump 134.

Fluid pressure from the pump 134 admitted to the conduit 82 and the cavity 56 causes the valve rod 52 to move toward the conduit 81 until it contacts the plug 77. When this movement of the valve rod 52 has been completed, the slot 72 in the valve rod 52 will have passed partly through the close fitting guide 54 so that fluid, under pressure, can pass from the chamber 56 through the slot 72 into the chamber 62 in cylinder 51, thus applying pressure upon the piston head 49. This pressure will cause the ram 46 to move toward the conduit 81 in the cylinder 50, displacing fluid from the chamber 61 in the cylinder 50, through the holes 73 and 75, through the bore 69, through slot 71 into the chamber 55 and out through the conduit 81, the conduit 165, the four-way valve 166 and the conduit 138, into the fluid tank 137.

As the ram 46 moves well toward the conduit 81, the ring 67 covers up the relatively large radial holes 73 in the valve rod 52, thereby producing a reduction in the discharge area and a throttling of the fluid discharged from the chamber 61. When the ram 46 continues in its movement toward the conduit 81, the ring 67 covers up the holes 75, one after another, thereby gradually still further increasing the throttling effect on the discharge of the fluid. This progressing throttling effect slows up the movement of the ram 46 toward the conduit 81 and continues until the ring 67 has just covered the outwardmost hole 75, at which point the ram has substantially stopped, in which the annular abutting portion 63 is abutted in relation with the face 65 of the cylinder 50.

Due to the fact that the rack 45, meshing with the gear segment 43, is connected with the ram 46, the movement of the ram 46, as just described, has rotated the lifting plunger 25 by a predetermined angle, while slowing down this rotating movement when the turret 14 approaches its new position. When this position is reached cam 197 of the next cam block 195 opens the switch 159 thereby interrupting the holding circuit for the relay coil 151.

Consequently, relay 153 is de-energized and the spring 132 returns the valve member of the four-way valve 131 to its upper position, thereby effecting communication of the conduit 139, leading to the bore 37 in the hollow arm 32, with the conduits 133 and 135 leading to the pressure side of the pump 134. Thus, fluid pressure from the pump 134 enters the cylinder bore 33 (see Fig. 2), through the bore 37 and, acting upon the retraction side of piston 36, moves the latter downwardly, thereby lowering the turret 14 so as to seat the same upon the bed 11 and holding the turret in its position by engagement with the holding pin 18. Fluid expelled by the piston 36 during its downward movement passes through the conduit 130, the four-way valve 131 and the conduits 136, 138, into the fluid tank 137. As will be seen from Figure 2, illustrating this position, the clutch member 28 has then disengaged the corresponding recesses in the bearing 20.

As soon as the lifting plunger 25 has moved downwardly to such an extent that the clutch member 28 is disengaged from the bearing 20, the cam 198 engages the switch 183 and opens the same, thereby breaking the holding circuit for the relay coil 179. This causes the de-energization of the relay 170 so that the spring 167 of the four-way valve 166 lifts the valve member pertaining to the four-way valve 166 to its upper position. This upward movement of the valve member of the four-way valve 166 establishes communication between the conduit 165, leading to bore 81 (see Figure 4), and the conduit 135 leading to the pressure side of the pump 134. Consequently, pressure fluid from the pump 134 entering the bore 81 and chamber 55 will cause the valve rod 52 to move toward the plug 72 until it engages the latter. When this movement has been effected, fluid from the chamber 55 passes through the slot 71 into the chamber 61 where it acts upon piston head 48 and, in a manner similar to that previously described, causes the ram 46 to move toward the conduit 82.

Similarly, as described in connection with the reversed movement of the ram 46, the holes 76 are sequentially covered so that the movement of the ram 46 is gradually slowed down when the ram 46 approaches the end of its movement. The said movement of the ram 46 is completed when the annular abutting portion 64 engages the inner face 66 of the cylinder 51. During this movement of the ram 46, fluid expelled by the piston head 49 passes through the conduit 56, the conduit 192, the four-way valve 166 and the conduits 199 and 138 into the fluid tank 137. The movement of the ram 46, just described, causes the rack 45 to rotate the gear segment 43 in a direction reverse to that previously described so that at the end of this rotation the lifting plunger 25, in addition to being returned to its lower position, is also returned to its initial annular position, so as to be ready for another indexing or rotating movement of the turret.

Summary of operation

The operation of the device, according to the present invention, may be summarized as follows:

When the indexing operation of the turret is to be effected, pressure fluid is to be introduced into the cylinder-piston-assembly 33, 36 (Figure 2), so as to lift the turret 14 by means of the piston 36. The lifting movement of the turret causes cam 196 on the turret to close switch 191 (Figure 6), thereby supplying fluid from the pump 134 to the bore 82 (Figure 4), and causing the ram 46 to perform one stroke.

This movement of the said ram is transferred by the rack 44 and the gear segment meshing therewith to the piston 36 so as to rotate the same together with the turret connected therewith by means of the clutch members 28, 29. In this way the turret is rotated by a predetermined angle, depending on the length of the stroke of the ram 46. This rotative movement is slowed down at the end thereof by the gradual closing of the bores 73, 75. At the end of this rotating movement of the turret the switch 159 is opened so that the supply of pressure fluid to the piston 36 is reversed, resulting in a lowering of said piston and disengagement of the clutch member 27 from the turret, thereby re-seating the turret on the press bed. In this position the turret opens, by means of the cam 198, the switch 183 causing a reverse movement of the ram 46 which results in a reverse rotation of the piston 36 so as to return said piston to its initial position.

It will be understood that I desire to comprehend within my invention such modifications as come within the scope of the claims and the invention.

Having thus fully described my invention, what I claim as new and desire to secure by Letters Patent is:

1. A press comprising in combination a reciprocable press ram, a press bed, a rotatable support carried on said bed, said support being provided with a plurality of die receiving means and being operable to successively move said die receiving means into alignment with said press ram, a fluid operable plunger having its axis in alignment with the axis of rotation of said support and being operable selectively to lift said support off or to seat said support upon said bed, means responsive to movement of said plunger in lifting direction for rotatably connecting said plunger and said support, fluid operable means operatively connected with said plunger for rotating the same by a predetermined angle, and means responsive to a predetermined lifting movement of said plunger for making said fluid operable means effective, thereby causing one of said die receiving means to move out of alignment with said ram, while the next following die receiving means moves into alignment with said ram.

2. A press comprising in combination a press bed, a support carried on said bed and being rotatable successively from one indexing position to another indexing position, said support being adapted to receive a plurality of dies, a hydraulic cylinder-piston-assembly with the longitudinal axis thereof in alignment with the axis of rotation of said support, one element of said cylinder-piston-assembly being operable to lift said support off said bed, a reciprocable fluid operable plunger in continuous driving connection with said element and operable selectively to rotate the same by a predetermined angle, means associated with said element and responsive to a predetermined lifting movement thereof for rotatably interconnecting said element and said support, and means associated with said plunger for slowing down the movement of said plunger when the latter approaches the end of a stroke to slow down the rotative movement of said support when the latter approaches a new indexing position.

3. A press comprising a rotatable support for supporting a plurality of dies, a press bed for supporting said rotatable support, a first fluid operable cylinder-piston-assembly with the longitudinal axis thereof in alignment with the axis of rotation of said support, said cylinder-piston-assembly including an element operable selectively to lift said support off or to seat the same upon said bed, a second fluid operable cylinder-piston-assembly having a reciprocable member arranged in continuous driving connection with said element for selectively rotating the same by a predetermined angle alternately in one and the opposite direction, and means associated with said element and operable in response to a predetermined lifting movement of said element for rotatably connecting said element with said support, and also operable to interrupt said last mentioned connection between said element and said support in response to a predetermined seating movement of said element.

4. In a press, a press head, a press bed, spacer means spacing said press head and press bed, a pressing plunger reciprocably mounted in said press head, a rotatable support carried on said bed and arranged between said spacer means for receiving a plurality of dies and successively bringing the same into alignment with said plunger, a reciprocable member operable selectively to lift said rotatable support off or to seat the same upon said press bed, connecting means associated with said reciprocable member and responsive to a predetermined stroke of said reciprocable member in lifting direction for rotatably connecting said member with said support, a hydraulic motor rotatably engaging said reciprocable member for rotating said member by a predetermined angle, thereby moving said support from a first indexing position to a second indexing position, means responsive to the arrival of said support in said second indexing position for initiating the seating movement of said reciprocable member and thereby actuating said connecting means so as to interrupt the driving connection between said member and said support, and means responsive to said re-seating movement for reversing said motor, while maintaining said motor in driving engagement with said reciprocable member to return the latter to its initial position.

5. In a press, a press bed, a rotatable support normally seated on said press bed for receiving a plurality of dies, a hydraulically operable ram operable selectively to lift said support off or re-seat it on said press bed, a second fluid operable ram, a gear system constantly interconnecting said first ram and said second ram for effecting rotation of said first ram in opposite directions, and means responsive to the movement of said first mentioned ram in one direction for effecting driving connection between said first ram and said support, and responsive to the movement of said first ram in the opposite direction for interrupting said driving connection.

6. In a press, a vertically reciprocable turret adapted to be rotated from one station to another station, fluid operable means for effecting said reciprocating movement of said turret, hydraulic means adapted to rotate said turret and to slow down its movement when it approaches a new step, and electric means responsive to said reciprocating movement of said turret for controlling the direction of operation of said hydraulic means.

7. A hydraulic press comprising in combination a press bed, a press ram, a support for a plurality of dies normally seated on said press bed, a reciprocable and rotatable plunger operable to lift said support off said bed, clutch means associated with said plunger and responsive to the lifting movement of said plunger for rotatably connecting the same with said support, hydraulic means continuously in driving engagement with said plunger for rotating said support by a predetermined angle to successively bring said dies into alignment with said ram, said hydraulic means comprising slow-down means for slowing down said support at the end of its rotative movement, and means responsive to the rotation of said support by said predetermined angle for retracting said plunger to re-seat said support on said bed and to disconnect said support from said clutch means.

8. A press comprising in combination a rotatable turret for receiving a plurality of dies, a support for said turret, hydraulically reciprocable plunger means operable selectively to engage and lift said turret off or re-seat said turret on said support and disengage said turret, said plunger means comprising a clutch element for engagement with a clutch element on said turret, and a fluid operable cylinder-piston-assembly in constant driving engagement with said plunger means for rotating said hydraulically reciprocable plunger means selectively in one direction or the other direction.

9. In combination in a press, a rotatable and reciprocable turret for receiving a plurality of dies, a support for said turret normally engaging said turret, a pair of hydraulically operable pistons arranged in cylinders normal to one another, one of said pistons being arranged for selectively lifting said turret off and re-seating the same upon its support, and having gear means associated therewith and constantly meshing with gear means on the other piston, said last mentioned gear means being reciprocable by reciprocation of the said last mentioned piston to alternately rotate said first mentioned piston in one and the opposite direction by a predetermined angle, means responsive to the lifting movement of said first mentioned piston for rotatably connecting said first mentioned piston with said turret, and means to cushion the movement of rotation of said first mentioned piston and thereby of said turret at the end of said rotative movement.

10. In combination in a press, a pair of hydraulically operated pistons arranged in cylinders mounted angularly with respect to each other, means on one piston for rotating the other piston by the reciprocation of the first piston, means for reciprocating the second piston so rotated, a rotatable turret for receiving a plurality of dies, means for selectively rotatably connecting said turret with or disconnecting it from said second piston, and fluid throttling means associated with said first piston for slowing down said turret at the end of its rotating movement.

11. In a press, a press bed, a turret for receiving a plurality of dies, said turret being rotatable relative to said bed, a first hydraulically operable piston for selectively lifting said turret off or seating it upon said bed, means for rotatably connecting said first piston with said turret, a second hydraulically operable piston operatively connected with said first piston for rotating said first piston and said turret by a predetermined angle when performing one stroke, adjusting means associated with said second piston for micromatically adjusting the length of the stroke of the second piston, and slow-down means associated with said second piston for automatically slowing down said turret at the end of its angular movement.

12. In a press comprising a turret for receiving a plurality of dies, a support for supporting said turret during the pressing operation, a first hydraulically operable piston for selectively lifting said turret off and reseating it upon said support, means for rotatably connecting said first piston with said turret, a second hydraulically operable piston operatively connected with said first piston for rotating said first piston and said turret by a predetermined angle when performing one stroke, slow-down means associated with said second piston for slowing down the turret at the end of its angular movement, and electric relay means controlled by said turret for controlling the supply of fluid acting upon said pistons.

13. In a press, a press bed, a reciprocable and rotatable turret for receiving a plurality of dies, said turret being supported by said press bed during the pressing operation, a first hydraulically operable piston for selectively lifting said turret from, or seating said turret on said press bed, means associated with said first piston and said turret for rotatably connecting said turret and said first piston to each other, a second hydraulically operable piston, a gear mechanism constantly interconnecting said first piston and said second piston and operable by the latter so as to rotate said first piston and said turret by an angle depending upon the length of the stroke of said second piston, an electric circuit comprising relay means for controlling the supply of fluid to said first and second pistons, said relay means being arranged in an electric circuit adapted to be closed for starting the indexing movement of said turret, and a plurality of switches arranged in said circuit and controlled by movement of said turret for controlling said circuits.

14. In a press, a press bed, a rotatable and vertically reciprocable turret for receiving a plurality of dies, said turret being seated on said press bed during the pressing operation, a plurality of cam blocks carried by said turret and corresponding in number to the number of dies adapted to be received by said turret, first hydraulically operable means for lifting said turret off said press bed, connecting means for rotatably connecting said first hydraulically operable means with said turret so as to rotate the same when said first hydraulically operable means in rotated, second hydraulically operable means for rotating said first hydraulically operable means by a predetermined angle, slow-down means associated with said second hydraulically operable means for slowing down the said turret at the end of its rotation, an electric circuit comprising relay means for controlling supply of pressure fluid to said first and second hydraulically operable means, and switch means provided in said electric circuit and controlled by said cam blocks for controlling the energization or deenergization of said relays.

15. In a press, a press bed, a turret normally supported by said press bed and adapted to receive a plurality of dies, a first hydraulically operable piston for selectively lifting said turret off said bed and re-seating said turret on said bed, a second fluid operable piston connected with said first piston for selectively rotating said first piston in one direction or the other, means for rotatably connecting said turret to said first piston in response to the lifting movement of said first piston and for disconnecting said turret from said first piston in response to the re-seating movement of said first piston, hydraulic cushioning means associated with said second piston for cushioning the turret at the end of its rotation through a predetermined angle, controlling means carried by said turret, and electric means for operation by said controlling means during the rotation of said turret for controlling the movement of said pistons.

WARREN R. TUCKER.